United States Patent
Fitchett (10) Patent No.: US 10,815,045 B2
(45) Date of Patent: Oct. 27, 2020

(54) REUSABLE PROTECTIVE SLEEVE FOR FOOD SERVICE WRAP DISPENSING CARTONS

(71) Applicant: Jeffrey E. Fitchett, Ellicott City, MD (US)

(72) Inventor: Jeffrey E. Fitchett, Ellicott City, MD (US)

( * ) Notice: Subject to any disclaimer, the term of this patent is extended or adjusted under 35 U.S.C. 154(b) by 0 days.

(21) Appl. No.: 16/465,197

(22) PCT Filed: Oct. 12, 2017

(86) PCT No.: PCT/US2017/056259
§ 371 (c)(1),
(2) Date: May 30, 2019

(87) PCT Pub. No.: WO2018/102033
PCT Pub. Date: Jun. 7, 2018

(65) Prior Publication Data
US 2019/0329964 A1 Oct. 31, 2019

Related U.S. Application Data

(60) Provisional application No. 62/427,877, filed on Nov. 30, 2016.

(51) Int. Cl.
*B65D 83/08* (2006.01)
*B65H 16/00* (2006.01)

(52) U.S. Cl.
CPC ....... *B65D 83/0841* (2013.01); *B65H 16/005* (2013.01)

(58) Field of Classification Search
CPC .............. B65D 83/0841; B65D 85/672; B65D 83/0805; B65D 5/4608; B65D 85/671;
(Continued)

(56) References Cited

U.S. PATENT DOCUMENTS 1,594,452 A    8/1926  Caylor
2,935,192 A *  5/1960  De Million-Czarnecki ................
                                                    B65D 83/0882
                                                    206/396

(Continued)

OTHER PUBLICATIONS

International Search Report and Written Opinion of the International Searching Authority for PCT/US2017/056259, dated Jan. 8, 2018.

*Primary Examiner* — Christopher R Demeree
(74) *Attorney, Agent, or Firm* — Rosenberg, Klein & Lee (57) ABSTRACT

A reusable protective sleeve for food service wrap dispensing cartons is provided. The protective sleeve includes a body having a pair of opposing longitudinally spaced end panels and a pair of laterally spaced opposing side panels joined together at respective adjoining edges. The body further has a base panel joined to corresponding edges of the end panels and the side panels to define an interior space bound by the joined panels. The body has an open side opposite to the base panel through which a food service wrap dispensing carton is insertably received into the interior space. The body is formed of a resilient liquid impervious elastomeric material and configured to tightly embrace the food service wrap dispensing carton received in the interior space to protect the carton against infiltration by contaminated liquids.

19 Claims, 6 Drawing Sheets

(58) Field of Classification Search
CPC .... B65H 16/005; B65H 23/08; B65H 23/085; B65H 2402/41; B65H 2402/442; B65H 2701/1752; A47J 47/08; A47J 41/0066; B65B 25/146
USPC ......... 229/87.18, 117.17, 223; 206/395, 396, 206/397, 409, 408; 225/47, 52, 48, 49; 242/588.4; D9/711
See application file for complete search history.

(56) References Cited

U.S. PATENT DOCUMENTS

| | | |
|---|---|---|
| 3,295,717 A | 1/1967 | Gantner |
| 3,384,264 A | 5/1968 | Wallace et al. |
| 3,537,116 A | 11/1970 | Kain |
| 4,085,785 A | 4/1978 | Hoot |
| 4,538,385 A | 9/1985 | Kandarian |
| 4,858,755 A | 8/1989 | Kuivanen |
| 4,869,363 A | 9/1989 | Goldberg |
| 4,901,852 A | 2/1990 | King |
| 4,909,410 A | 3/1990 | Derby et al. |
| 5,967,390 A | 10/1999 | Goryl |
| 6,364,185 B2 | 4/2002 | Wu |
| 6,540,076 B1 * | 4/2003 | Elia .................. B41F 13/193 206/396 |
| 6,834,773 B2 | 12/2004 | Wu |
| 7,275,656 B1 | 10/2007 | Samadani |
| 8,156,715 B2 | 4/2012 | Nowak et al. |
| 8,469,187 B2 | 6/2013 | Wattenbarger et al. |
| 9,873,549 B2 * | 1/2018 | Heinz .................. B65D 21/086 |
| 9,975,661 B2 * | 5/2018 | Bagley ................ B65D 21/086 |
| 10,092,137 B1 * | 10/2018 | Nelson ................ A47J 41/0066 |
| 10,105,014 B2 * | 10/2018 | Bagley .................... A47J 47/08 |
| 2002/0139705 A1 | 10/2002 | Hajianpour |
| 2008/0047967 A1 | 2/2008 | Brunner et al. |
| 2009/0183807 A1 | 7/2009 | Sadlier |
| 2011/0079330 A1 | 4/2011 | Raine et al. |
| 2016/0059990 A1 | 3/2016 | Patikas-Bryant |

* cited by examiner

REUSABLE PROTECTIVE SLEEVE FOR FOOD SERVICE WRAP DISPENSING CARTONS

REFERENCE TO RELATED APPLICATION

This Application is based on PCT Application Serial No. PCT/US2017/056259, filed 12 Oct. 2017, currently pending, which was based on Provisional Application 62/427,877, filed 30 Nov. 2016, the disclosure of which is expressly incorporated herein by reference in its entirety.

BACKGROUND OF THE INVENTION

This disclosure directs itself to a reusable protective sleeve for application to a food service wrap dispensing carton. The reusable protective sleeve protects a food service wrap dispensing carton from infiltration by contaminated liquids such as that from raw foods or commercial cleaning products. More in particular, the disclosure is directed to a reusable protective sleeve for food service wrap dispensing cartons that includes a body enclosing an interior space and having a parallelepiped contour with a longitudinally extended open side for receiving a food service wrap dispensing carton therethrough into the interior space. The body is formed in one-piece formation of a flexible, elastic and liquid impervious material. The body is further configured to tightly embrace the food service wrap dispensing carton received within the interior space thereof. Further, the body has a pair of longitudinally spaced end walls, where each of the end walls has a respective through opening formed therein and disposed in correspondence with respective hand holes of the food service wrap dispensing carton received in said interior space. Each end wall has a bulbous rim circumscribing the through opening formed therein and extending outwardly from an outer surface of the respective end wall. Yet further, the disclosure is directed to a reusable protective sleeve for food service wrap dispensing cartons that includes a body having pair of laterally spaced opposing side walls extending between corresponding sides of the pair of end walls and defining corners of the body thereat. The body has outwardly extended flange portions disposed at edge portions of the end and side walls adjacent an open side at each of the corners of the body. Each of the side walls has at least one rib formed therein and extending outwardly from an external surface of the respective side wall. The body further has an outwardly extended flange circumscribing the open side. Additionally, the body has a longitudinally extended base wall disposed opposite to the open side and the base wall has a plurality projections extending outwardly from an exterior surface thereof.

Figure 1:
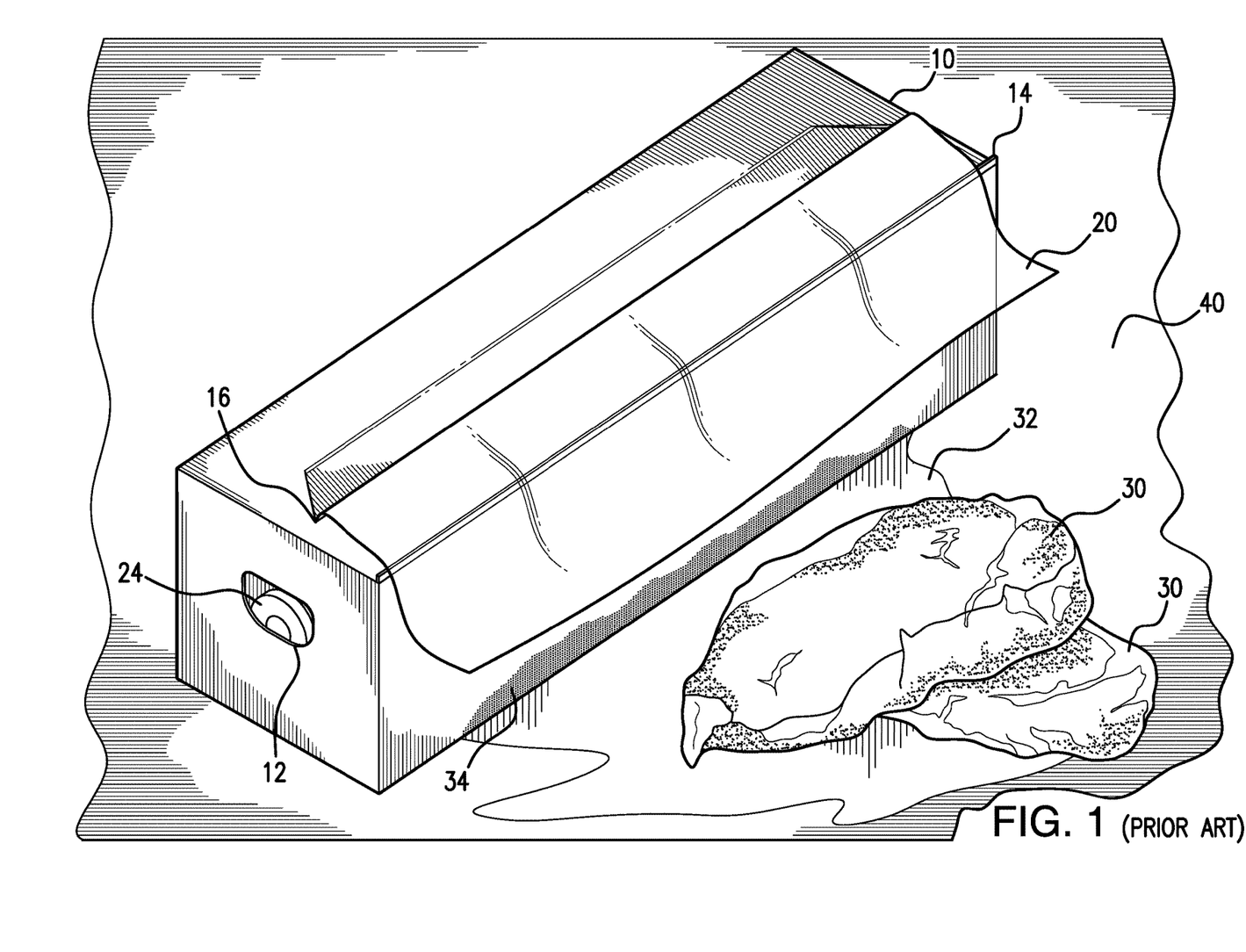
FIG. 1 is an illustration of a conventional food service wrap dispensing carton in a typical working environment.

The conventional food service wrap dispensing carton 10, illustrated in FIG. 1, is of a type widely used in restaurants and catering businesses. The food service wrap dispensing carton 10 is a paperboard or cardboard container in the form of a box having hand openings 12 in opposing end walls thereof. The food service wrapping material 20 is typically a food grade paper product, plastic film or aluminum foil provided on a spool 24 that is placed in the container 10 and withdrawn therefrom through a slotted opening 16, or the like, to be cut into an appropriate sized sheet using a integral cutting blade or device 14.

The problem of such food service wrap dispensing cartons 10 becoming infiltrated by liquid 32, potentially contaminated by bacteria from raw foods 30, is illustrated in FIG. 1 and a well-known problem in the food service industry. Raw foods 30 are often washed or defrosted and subsequently placed on a countertop 40 to be divided into individual serving portions and wrapped prior to being refrigerated. The moisture 32 from the food products, whether contaminated or not, accumulates on the countertop 40 and is free to flow overtime on the countertop, which may then contact the carton 10 and be absorbed thereby. As such food service wrap dispensing cartons 10 are made of paperboard or cardboard, the portion of the carton 10 contacting the liquid and portions adjacent thereto will contain the absorbed liquid 34. Since such absorbed liquid 34 may, be or become, contaminated with bacteria, continued use of the carton 10 creates the potential cross contamination to other foods prepared and wrapped using the carton 10. Even if the liquid in not contaminated, the absorbed liquid causes deterioration of the carton 10. In addition to bacterial cross-contamination, cross-contamination of potential allergens is also a problem, even when dry materials are being wrapped.

To solve this problem a number of different food service wrap dispensing carton holders have been developed and made commercially available to the food service industry. These prior art holders take the form of rigid containers having an interior space adapted to receive the food service wrap dispensing carton therein. Such holders are typically made of painted or stainless steel, or a rigid plastic material such as Acrylonitrile Butadiene Styrene (ABS). Another form of food service wrap holder is in the form of a frame structure, typically an A-frame, where the spool of food service wrap is removed from the dispensing carton and mounted on the frame. Such frame type holders are usually manufactured from a metallic material.

While such prior art systems function to prevent liquid infiltration of food service wrap dispensing carton, they create other problems for food service providers. The prior art holders for food service wrap dispensing cartons are costly, are of heavy weight, and take up significant storage space when not in use. Whereas, the disclosed reusable protective sleeve includes a flexible light weight body formed of a soft, resilient and liquid impervious elastomeric material that is able to tightly embrace the food service wrap dispensing carton which is received in an interior space of the body. The disclosed reusable protective sleeve is foldable and easily compressed for storage when not in use. Also, the material of the body and/or the configuration of the body's exterior bottom surface provides high resistance to sliding displacement and thereby maintains the dispensing carton, sheathed by the protective sleeve, in place while the food service wrap, which may be a film, foil or paper product, is withdrawn from the dispensing carton.

SUMMARY OF THE INVENTION

A reusable protective sleeve for food service wrap dispensing cartons is disclosed. The reusable protective sleeve includes a body enclosing an interior space and having a parallelepiped contour with a longitudinally extended open side for receiving a food service wrap dispensing carton therethrough into the interior space. The body is formed in one-piece formation of a flexible, elastic and liquid impervious material, and configured to tightly embrace the food service wrap dispensing carton received in the interior space.

Additionally, the body has a pair of longitudinally spaced end walls, each end wall may have a respective through opening formed therein and disposed in correspondence with respective hand holes of the food service wrap dispensing carton received in the interior space. Further, the body has a pair of laterally spaced opposing side walls extending between corresponding sides of the end walls and defining corners thereat, and outwardly extended flange portions disposed at edge portions of the end and side walls adjacent to the open side, at each of the corners of the body.

From another aspect, a reusable protective sleeve for food service wrap dispensing cartons is provided that includes a body having a pair of opposing longitudinally spaced end panels and a pair of laterally spaced opposing side panels joined together at respective adjoining edges thereof. The body further has a base panel joined to corresponding edges of the end panels and the side panels to define an interior space bound by the joined panels. The body has an open side opposite to the base panel through which a food service wrap dispensing carton is insertably received into said interior space. The body is formed of a flexible, resilient and liquid impervious polymeric material, and configured to tightly embrace the food service wrap dispensing carton received in the interior space.

DETAILED DESCRIPTION OF THE PREFERRED EMBODIMENTS

Referring to FIGS. 2-7, there is shown reusable protective sleeve 100 for use with a food service wrap dispensing carton 10. As will be further described in following paragraphs, protective sleeve 100 is a reusable, flexible, elastic, liquid impervious and hygienic body 110 configured to receive a carton 10 of spooled commercial grade food service wrapping material 20 therein. Protective sleeve 100 provides a convenient and low cost means by which those involved in the food service industry can maintain hygienic conditions while using conventional cartons 10 of spooled commercial grade food service wrapping materials 20.

Figure 2:
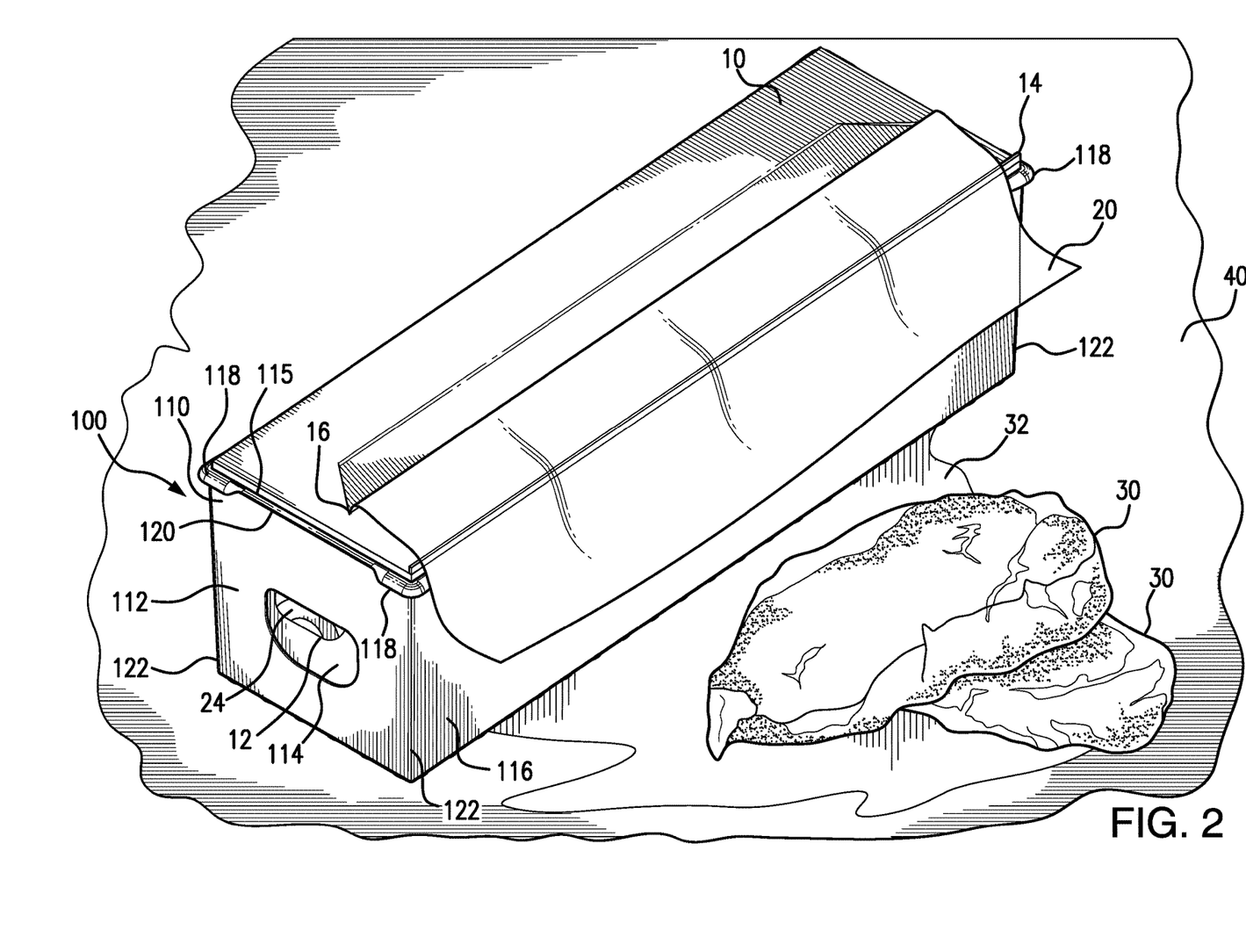
FIG. 2 is an illustration of the present invention in use in a typical working environment.

The standard food service wrap dispensing carton 10, shown in FIGS. 1 and 2, is a paperboard or cardboard container in the form of a box in which a spool 24 of the wrapping material 20 is supplied. Wrapping materials such as food grade paper products, plastic film and aluminum foil are normally supplied in such dispensing containers. The dispensing carton 10 has a slotted opening 16 through which the wrapping material 20 is withdrawn therefrom. The dispensing carton 10 also typically has a cutting blade or cutting device 14 secured thereto adjacent the slotted opening 16 and has hand holes 12 formed through opposing end walls of the carton 10.

Referring now to FIG. 2, protective sleeve 100 is designed to sheathe a standard food service wrap dispensing carton 10, leaving the slotted opening 16 and the attached cutting blade or cutting device 14 exposed so that the dispensing carton 10 retains its functionality. Protective sleeve 100 has a body 110 formed of a soft, flexible, elastic and liquid impervious material. Elastomeric polymers including silicones, urethanes, polyurethanes, thermoplastic elastomers, thermoplastic vulcanizates, such as Santoprene™, and rubber resins may be suitable materials for use in forming the protective sleeve body 110. Body 110 may be formed in "the flat" and then assembled by folding portions thereof and bonding them together, by techniques well known in the art. However, body 110 is most efficiently formed integrally in one-piece formation by such manufacturing processes as injection molding, cast molding, 3D printed, stereo lithography, or vat dipping. The material of body 110 should have a Shore hardness in the range of 50 A to 70 A and a nominal wall thickness in the approximate range of 0.03125 to 0.0625 inches. The material of body 110 should further be disposed to being colored to correspond to the color coding utilized in the food service industry. Accordingly, protective sleeve 100 will aid in the prevention of various types of cross-contamination, including functional (raw vs. cooked), departmental (fish vs. chicken) and allergen (dairy vs. wheat).

In one working embodiment, body 110 was formed by injection molding of Santoprene™ thermoplastic vulcanizate with a nominal wall thickness of 0.045 inches and a Shore hardness of 60 A. The thermoplastic vulcanizate material of body 110 has also been molded in in colors corresponding to the color coding used in the food service industry. The soft material composition of body 110 serves as a protective bumper for the corners and edges of the carton 10 inserted into the body 110 to prevent damage to the carton 10 during use and transport while disposed in the sleeve 100. In addition to helping to maintain the integrity of the carton 10 against damage, the tight fit of protective sleeve 100 reinforces the carton and holds the carton in its parallelepiped form. The light weight, soft and flexible character of the material of body 110 allows the body 110 to be easily folded for shipping and storage, and minimizes the space required for such.

Body 110 has a parallelepiped contour with a pair of longitudinally spaced end walls or panels 112, a pair of longitudinally extended side walls or panels 116 extending between respective opposing sides of the end walls 112 and a base wall or panel 124 extending longitudinally between the end walls 112 and laterally between the pair of side walls 116. Together, the pair of end walls 112, pair of side walls 116 and base wall 124 encloses an interior space 140, shown in FIGS. 5-7, into which the dispensing carton 10 is received. The body 110 has an open side 115 located opposite to the base wall 124 and in open communication with the interior space 140 through which the dispensing carton 10 is passed into the internal space 140. The dimensions of the body 110, prior to being sleeved onto the dispensing carton 10, are designed for the interior space 140 to be smaller than the outer dimensions of the carton 10, by a difference approximating 0.5 to 0.6 inches in length and width. Thus, the body 110 must be stretched to accommodate the carton 10 within the interior space 140. By that arrangement, the body 10 snugly engages the carton 10 and thereby remains in place as it handled by food service works during use of the food service wrapping material 20.

With the liquid impervious protective sleeve 100 sheathed on the dispensing carton 10, any contaminated liquid 32 that puddles or otherwise is deposited on the work surface or countertop 40, upon which protective sleeve 100 rests, will be prevented from coming in contact with the carton 10. Subsequent to use in wrapping the raw food products 30, for example, the sleeve 100 may be removed from the carton 10, washed and dried, and then reapplied to the carton 10. Obviously, a food service provider may have multiple sleeves 100 so that a previously washed and dried sleeve 100 may be reused to replace one in need of cleaning to allow further food wrapping operations to be carried out without a significant delay.

Figure 3:
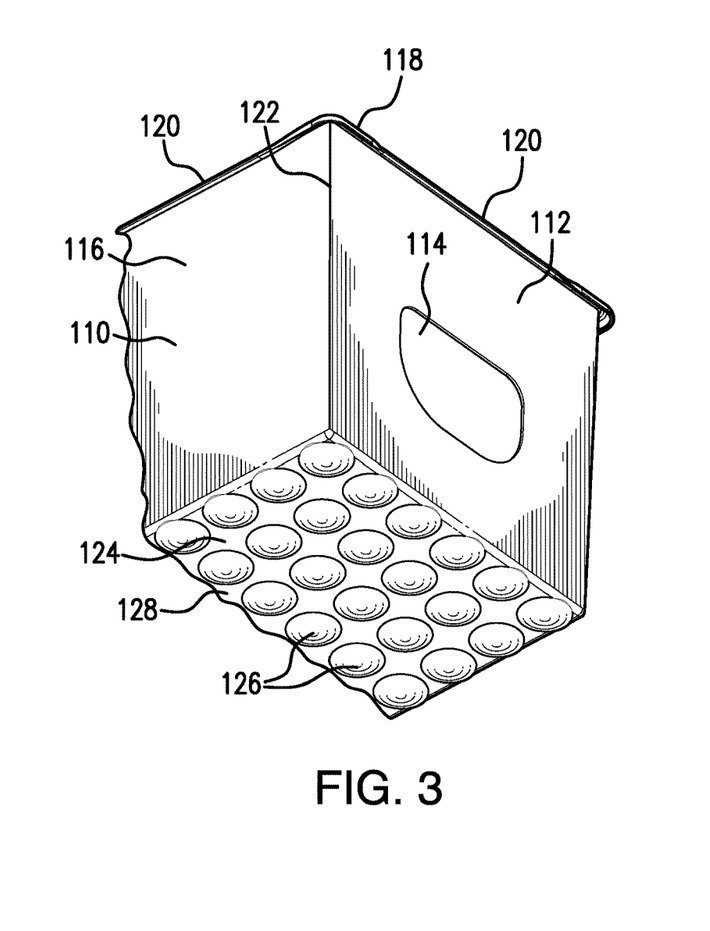
FIG. 3 is a cutaway perspective view of the present invention showing projections on the bottom surface thereof.
Figure 4:
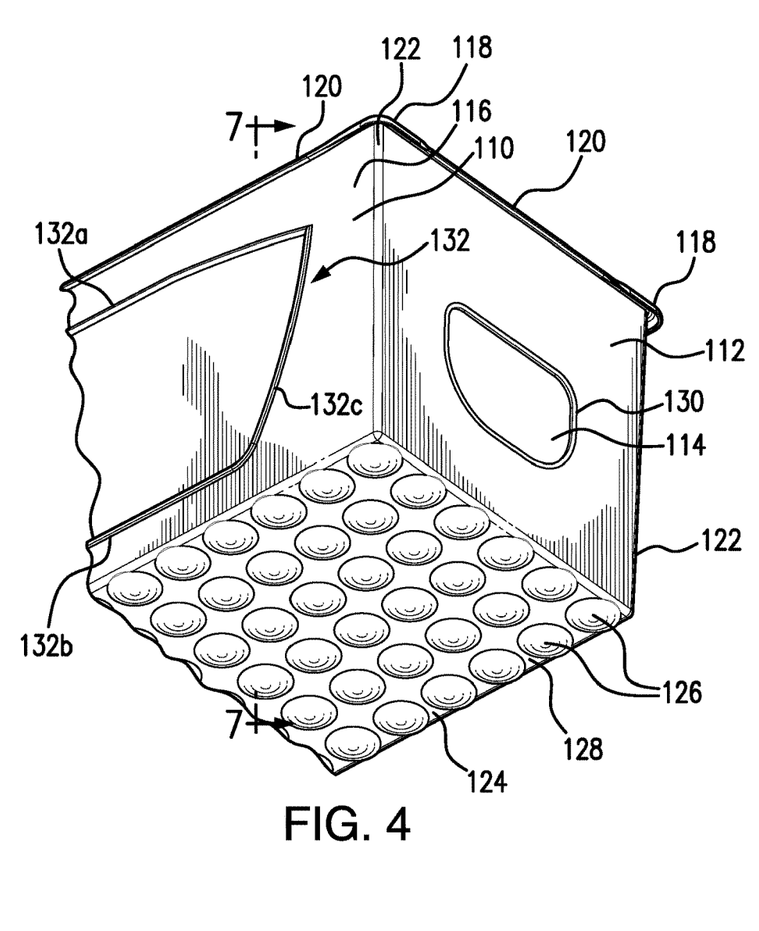
FIG. 4 is a cutaway perspective view of the present invention showing projections on the bottom surface thereof, a side wall rib and an end wall opening reinforcing rim.

Referring additionally to FIGS. 3 and 4, the body 110 is provided with outwardly extending corner flange portions 118, which can serve as an aid for installing protective sleeve 100 on the carton 10 and removing it therefrom. The corner flange portions 118 are located adjacent the open side 115 and extend along adjacent upper edge portions of the side walls 116 and end walls 112, in correspondence with corner portions 122 of the body 110. The corner portions 122 of the body 110 are defined at edges of contiguous portion of the end and side walls 112, 116 extending between the base wall 124 and open side 115. The body 110 may have a extended flange circumscribing the open side 115 defined by the combination of the corner flange portions 118 and respective extended flange portions 120 that extend between corresponding pairs of corner flange portions 118. In this arrangement, the corner flange portions 118 extend outwardly a greater distance from the open side 115 than do the extended flange portions 120. The extended flange portions 120 provide stiffness and strength to the upper edges of the end and side walls 112, 116, and add further tear resistance thereto. In one working embodiment, the corner flange portions 118 extended outwardly an approximate distance of 0.25 inches beyond the outward extension of the longitudinally extended portions 120.

Figure 5:
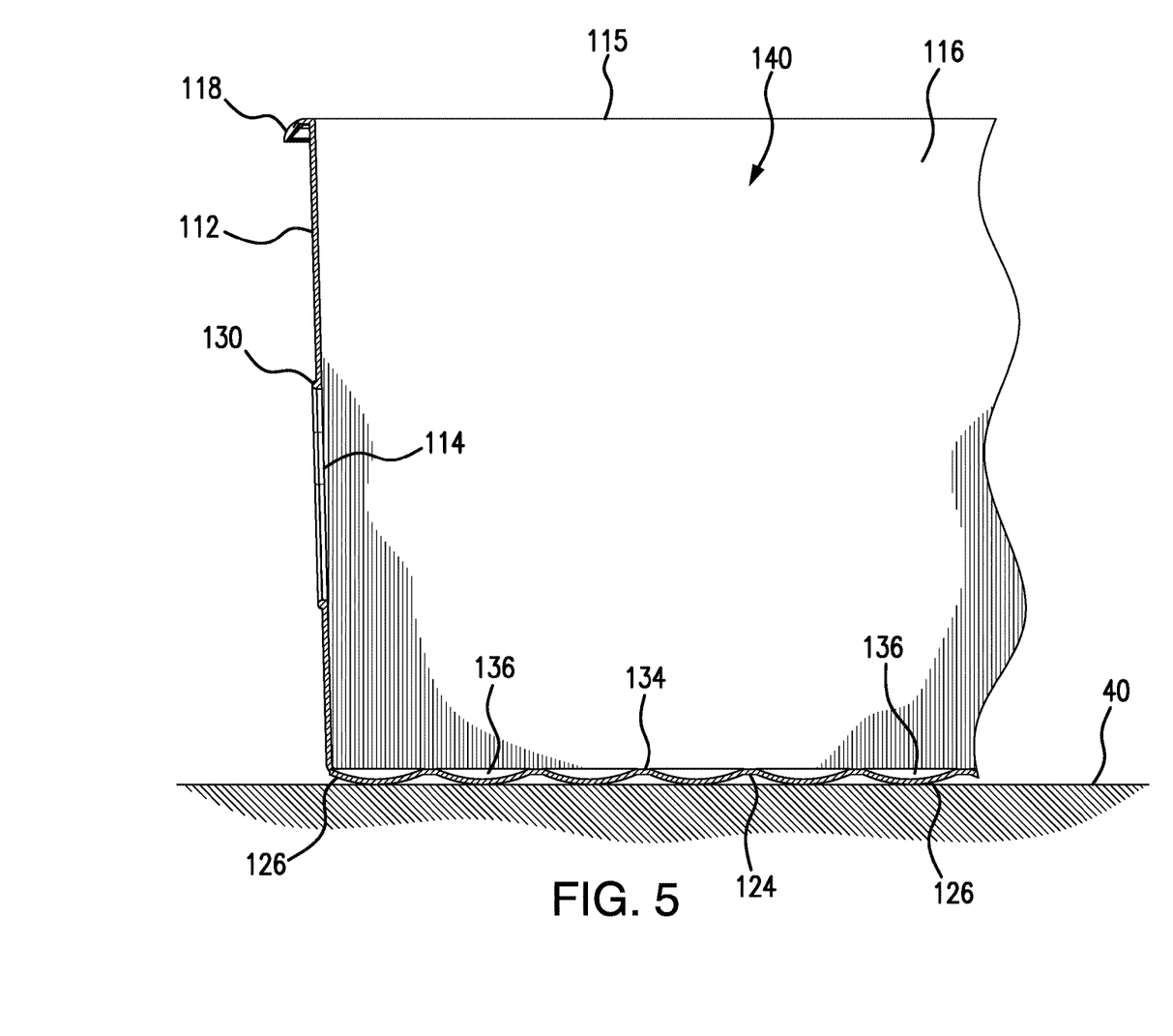
FIG. 5 is a cutaway longitudinal cross-sectional view of the present invention with the base wall having recesses formed in correspondence to the projections formed on the outer surface thereof.
Figure 6:
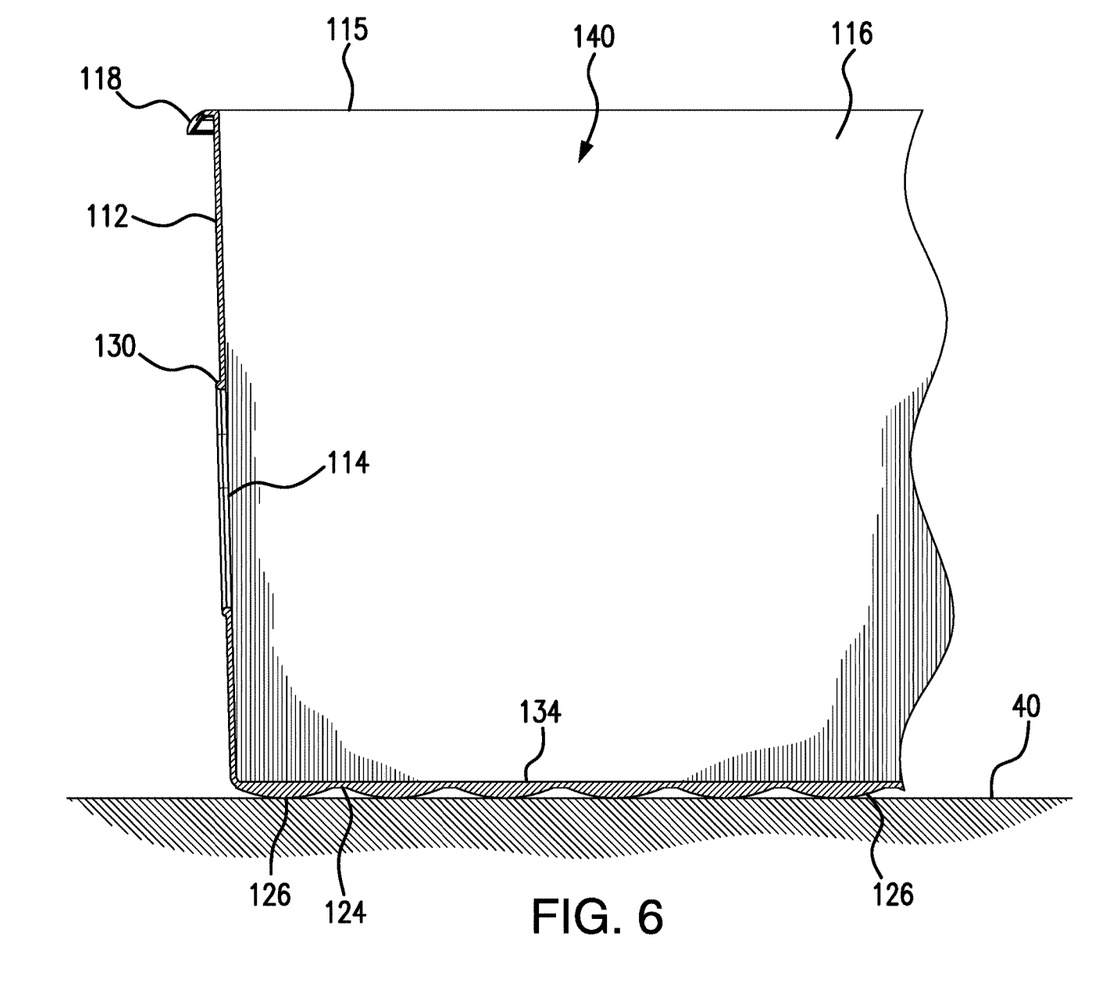
FIG. 6 is a cutaway longitudinal cross-sectional view of the present invention with the projections formed on the outer surface having another structure.

The base wall 124 has a bottom surface 128 in which a plurality of projections 126 are formed. Projections 126 can serve to increase the coefficient of friction of the bottom surface 128 of base wall 124 where the projections are created with corresponding depressions 136 being formed in the inner surface 134 of the base wall 124, as shown in FIG. 5. By that arrangement, the projections 126 are collapsible and in doing so can create folds that increase the resistance of the body 110 to sliding on the countertop 40. The projections 126 also space the bottom surface 128 between the projections above the countertop 40 to provide a path for fluids to pass under the body 110, rather than form a dam that would otherwise redirect fluids. By spacing the bottom surface 128 from the countertop 40, such limits the surface area of body 110 placed in contact with potential contaminants. Further, the projections 126 prevent the bottom surface 128 from sticking to a wet work surface due to surface tension of the liquid that would make it difficult to move the protective sleeve 100 from one work area to another. The projections 126 may also be formed as solid structures, as shown in FIG. 6, such as by thickening the base wall 124 thereat, with the inner surface 134 of base wall 124 being substantially flat. The coefficient of friction between the projections 126 and the countertop 40 can be increased by forming the projections of a softer durometer of the same or different material by co-molding, casting, 3D printing or other techniques well known in the art. Although the projections 126 have been depicted as having a partially spherical contour, the projections 126 may have any geometric contour to increase the sliding resistance thereof.

Figure 7:
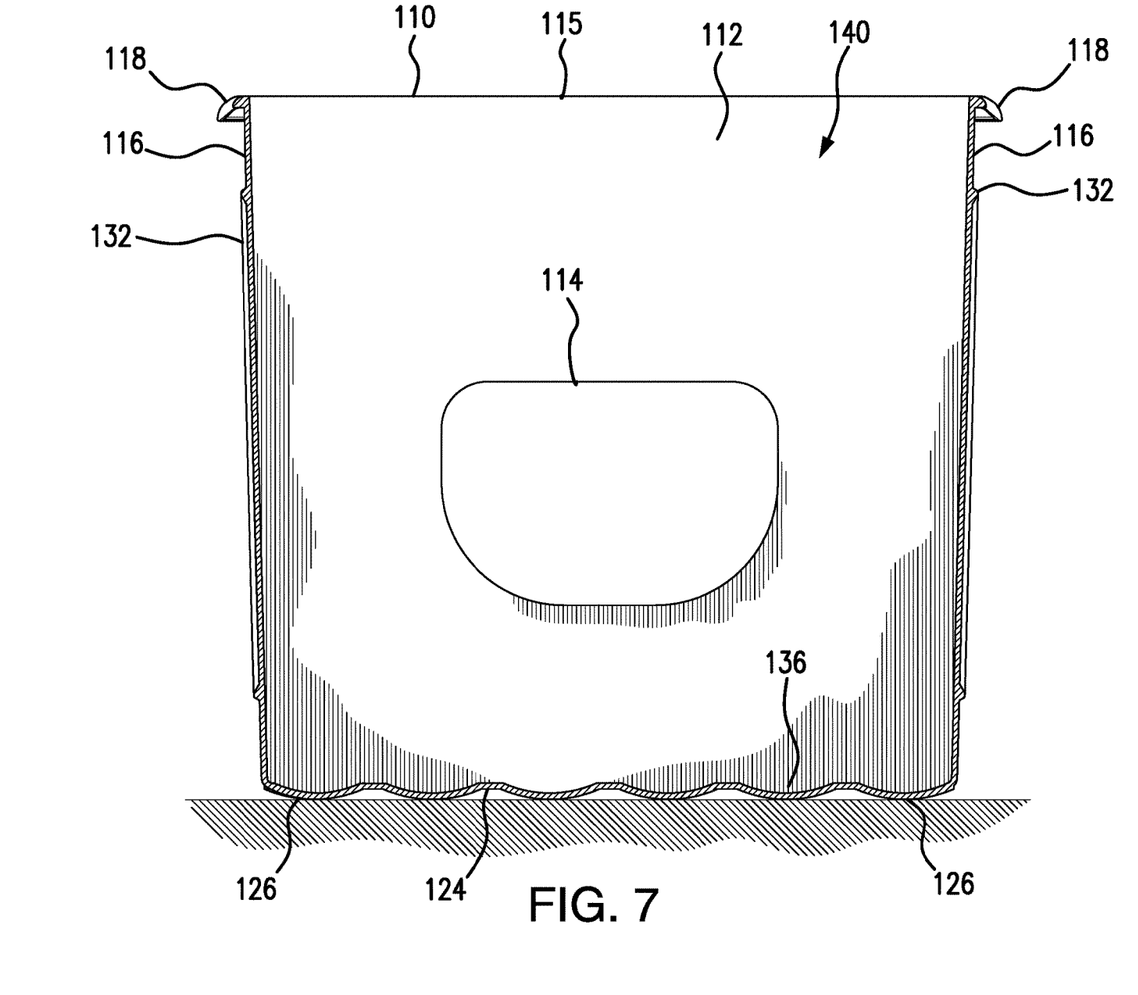
FIG. 7 is a transverse cross-sectional view of the present invention taken along the section line 7-7 in FIG. 4.

As shown in FIG. 4-6, the through openings 114 formed in the end walls 112 can be provided with a bulbous rim 130 circumscribing the perimeter of the opening. A bulbous rim 130 is a thickened bead of the material of body 110 that extends outwardly from the outer surface of each end wall 112 to both reinforce the edge of the opening 114, adding tear resistance to the associated end wall 112 at the opening 114. Additionally, bulbous rim 130 also acts as a stiffening rib to stiffen the corresponding end wall 112. Referring additionally to FIG. 7, the side walls 116 may also be stiffened by incorporation of rib one or more ribs 132. Each rib 132, like the bulbous rim 130, is formed by a thickened bead of the material of body 110 that extend outwardly from the outer surface of each side wall 116. The one or more ribs 132 may have an arcuate or polygonal cross-sectional contour and extend longitudinally, laterally or both. Where both longitudinal and lateral ribs are provided, they may be separate and distinct from one another or interconnected and may extend in substantially a straight line or extend along an arcuate path. In one working embodiment, each side wall 116 has a rib 132 formed in a closed contour. Each rib 132 has upper and lower longitudinal rib portions 132a and 132b, and a pair of lateral rib portions 132c interconnecting with the corresponding ends of the upper and lower longitudinal rib portions 132a and 132b. In the embodiment depicted, lower rib portion 132b extends along a substantially straight path while the upper rib portion 132a and lateral rib portions extend along substantially arcuate paths of respective relatively large radii. Where ribs 132 are arranged in closed contours, they may be arranged concentrically or separately in side-by-side or staggered arrangements.

The descriptions above are intended to illustrate possible implementations of the present invention and are not restrictive. While this invention has been described in connection with specific forms and embodiments thereof, it will be appreciated that various modifications other than those discussed above may be resorted to without departing from the spirit or scope of the invention. Such variations, modifications, and alternatives will become apparent to the skilled artisan upon review of the disclosure. For example, functionally equivalent elements may be substituted for those specifically shown and described, and certain features may be used independently of other features, and in certain cases, particular locations of elements may be reversed or interposed, all without departing from the spirit or scope of the invention as defined in the appended Claims. The scope of the invention should therefore be determined with reference to the description above, the appended claims and drawings, along with their full range of equivalents.

What is claimed is:

1. A reusable protective sleeve for food service wrap dispensing cartons, comprising a body enclosing an interior space and having a parallelepiped contour with a longitudinally extended open side for receiving a food service wrap dispensing carton therethrough into said interior space, said body having a pair of longitudinally spaced end walls, each of said end walls having a respective opening passing therethrough and disposed in correspondence with respective hand holes of the food service wrap dispensing carton received in said interior space, and through which the hand holes of the food service wrap dispensing carton are graspable, said body being formed in one-piece formation of a flexible, elastic and liquid impervious material, and configured to tightly embrace the food service wrap dispensing carton received therein, and each said end wall having a bulbous rim circumscribing said opening passing therethrough and being formed of a bead of the material of said body, said bulbous rim of each said end wall thereby adding tear resistance to said end wall at said opening and stiffening said end wall.

2. The reusable protective sleeve of claim 1, where said bulbous rim extends outwardly from an exterior surface of said end wall.

3. The reusable protective sleeve of claim 1, where said body has pair of laterally spaced opposing side walls extending between corresponding sides of said end walls and defining corners of said body thereat, said body further having outwardly extended flange portions disposed at edge portions of said end and side walls adjacent said longitudinally extended open side at each of said corners of said body.

4. The reusable protective sleeve of claim 3, where each of said side walls have at least one rib formed therein and spaced from said flange portions, said at least one rib extending outwardly from an external surface of said side wall to stiffen said side wall.

5. The reusable protective sleeve of claim 4, where said at least one rib is formed on each said side wall to extend in a closed contour configuration on said side wall.

6. A reusable protective sleeve for food service wrap dispensing cartons, comprising a body enclosing an interior space and having a parallelepiped contour with a longitudinally extended open side configured to receive a food service wrap dispensing carton therethrough into said interior space, said body having a pair of longitudinally spaced end walls, each of said end walls having a respective opening passing therethrough and disposed in correspondence with respective hand holes of the food service wrap dispensing carton received in said interior space, and through which the hand holes of the food service wrap dispensing carton are graspable, said body having an outwardly extended flange circumscribing said longitudinally extended open side, and said body being formed in one-piece formation of a flexible, elastic and liquid impervious material, and configured to tightly embrace the food service wrap dispensing carton received therein.

7. The reusable protective sleeve of claim 6, where said body has a pair of laterally spaced opposing side walls extending between corresponding sides of said end walls and defining corners thereat, said flange having corner portions extending a greater distance from said longitudinally extended open side than other portions of said flange spaced from said corners, said corner portions being at edge portions of said end and side walls adjacent said longitudinally extended open side at each of said corners of said body.

8. A reusable protective sleeve for food service wrap dispensing cartons, comprising a body enclosing an interior space and having a parallelepiped contour with a longitudinally extended open side configured to receive a food service wrap dispensing carton therethrough into said interior space, said body having a pair of longitudinally spaced end walls, each of said end walls having a respective opening passing therethrough and disposed in correspondence with respective hand holes of the food service wrap dispensing carton received in said interior space, and through which the hand holes of the food service wrap dispensing carton are graspable, said body having a longitudinally extended base wall disposed opposite to said longitudinally extended open side, said base wall having a plurality of projections extending outwardly from an exterior surface thereof, and said body being formed in one-piece formation of a flexible, elastic and liquid impervious material, and configured to tightly embrace the food service wrap dispensing carton received therein.

9. The reusable protective sleeve of claim 8, where said projections on said exterior surface of said base wall are formed with corresponding depressions on an interior surface of said base wall and are thereby collapsible.

10. A reusable protective sleeve for food service wrap dispensing cartons, comprising a body having a pair of opposing longitudinally spaced end panels and a pair of laterally spaced opposing side panels joined together at respective adjoining edges thereof to define corners of said body thereat, said body further having a base panel joined to corresponding edges of said end panels and said side panels to define an interior space bound by said joined panels, said body having a longitudinally extended open side opposite said base panel bounded by upper edges of said end and side panels and which is configured to insertably receive a food service wrap dispensing carton therethrough into said interior space, said body being formed of a flexible, resilient and liquid impervious elastomeric material, and configured to tightly embrace the food service wrap dispensing carton received in said interior space, said body having an outwardly extended flange circumscribing said longitudinally extended open side, said flange having corner flange portions extending a greater distance from said longitudinally extended open side than other portions of said flange spaced from said corners, said corner flange portions being at edge portions of said upper edges of said end and side panels adjacent to said longitudinally extended open side at said corners of said body, said corner flange portions aiding a user in inserting the food service wrap dispensing carton into said interior space and removal therefrom.

11. The reusable protective sleeve of claim 10, where each of said end panels has a respective opening passing therethrough and disposed in correspondence with respective hand holes of the food service wrap dispensing carton received in said interior space, and through which the hand holes of the food service wrap dispensing carton are graspable.

12. The reusable protective sleeve of claim 11, where each said end panel has a bulbous rim circumscribing said opening passing therethrough and being formed of a bead of said material of said body, said bulbous rim of each said end panel thereby adding tear resistance to said end panel at said opening and stiffening said end panel.

13. The reusable protective sleeve of claim 10, where each of said side panels has at least one rib formed therein and spaced from said flange, said at least one rib extending outwardly from an external surface of said side panel to stiffen said side panel.

14. The reusable protective sleeve of claim 10, where said base panel has a plurality projections extending outwardly from an exterior surface thereof and having corresponding depressions on an interior surface of said base panel and are thereby collapsible.

15. A reusable protective sleeve for food service wrap dispensing cartons, comprising a body having a pair of opposing longitudinally spaced end panels and a pair of laterally spaced opposing side panels joined together at respective adjoining edges thereof to define corners of said body thereat, each of said side panels having at least one rib formed therein and spaced from an upper edge thereof, said at least one rib extending outwardly from an external surface of said side panel to stiffen said side panel, said body further having a base panel joined to corresponding edges of said end panels and said side panels to define an interior space bound by said joined panels, said body having an open side opposite said base panel through which a food service wrap dispensing carton is insertably received into said interior space, said body being formed of a flexible, elastic and liquid impervious material, and configured to tightly embrace the food service wrap dispensing carton received in said interior space.

16. The reusable protective sleeve of claim 15, where said at least one rib is formed on each said side panel to extend in a closed contour configuration on said side panel.

17. The reusable protective sleeve of claim 15, where each of said end panels has a respective opening passing therethrough, each said end panel having a bulbous rim circumscribing said opening passing therethrough and extends outwardly from an exterior surface of said end panel, said bulbous rim of each said end panel thereby adding tear resistance to said end panel at said opening and stiffening said end panel.

18. The reusable protective sleeve of claim 15, where said body has an outwardly extended flange circumscribing said open side of said body, said flange having corner flange portions extending a greater distance from said open side than other portions of said flange spaced from said corners, said corner flange portions being at edge portions of said upper edges of said end and side panels adjacent to said open side at said corners of said body.

19. The reusable protective sleeve of claim 15, where said base panel has a plurality projections extending outwardly from an exterior surface thereof and having corresponding depressions on an interior surface of said base panel and are thereby collapsible.

\* \* \* \* \*